United States Patent Office 2,812,352
Patented Nov. 5, 1957

2,812,352

PREPARATION OF CARBOCYCLIC BICYCLIC KETONES

Marshall C. Freerks and Angelo J. Speziale, Kirkwood, Mo., assignors to Monsanto Chemical Company, St. Louis, Mo., a corporation of Delaware No Drawing. Application May 4, 1953, Serial No. 352,976

2 Claims. (Cl. 260—586)

This invention relates to an improved process for preparing the carbocyclic bicyclic ketone 2-keto-4a-methyl-1,2,4a,5,8,8a-hexahydronaphthalene

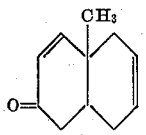

from sulfonic acid esters of 1-hydroxy-2-alkoxy-4-keto-4a-methyl-1,4,4a,5,8,8a-hexahydronaphthalenes.

In accordance with this invention the aforementioned carbocyclic ketone is prepared conveniently and in good yields by the reductive deacylation of a sulfonic acid ester of the formula

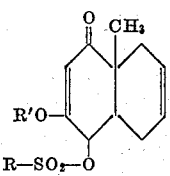

where R' is a short chain alkyl radical, i. e. one containing from one to five carbon atoms, and where R is an organic radical, preferably a carbocyclic radical, with lithium aluminum hydride and hydrolyzing the intermediate complex so formed by treatment with aqueous acid, preferably a mineral acid such as dilute hydrochloric, hydrobromic or sulfuric acids.

It will be obvious to those skilled in the art that the fused bicyclic nucleus of the sulfonic acid ester reactants of this invention contain three optically active carbon atoms. As a result thereof these reactants may exist in eight optically active forms and four racemates. All such forms are contemplated as coming within the scope of this invention. It is to be understood that where no notation appears with the name of the ester reactant that the name is to be interpreted in its generic sense, i. e., as representing the individual isomers in separated form as well as the racemic mixtures thereof or the total unresolved mixture of isomers or other mixtures of isomers.

The following examples are illustrative of the process of this invention:

Example I

To a suitable reaction vessel containing approximately 100 parts by weight (substantially 0.28 mol) of unresolved 1 - (p-tosyloxy)-4-keto-2-methoxy - 4a - methyl-1,4,4a,5,8,8a-hexahydronaphthalene dissolved in approximately 750 parts by weight of anhydrous diethyl ether is slowly added with agitation an anhydrous solution containing approximately 13 parts by weight (substantially 0.35 mol) of lithium aluminum hydride in 700 parts by weight of diethyl ether while maintaining the temperature during the addition at about 20–25° C. Upon completion of the lithium aluminum hydride addition the mix is heated at about 25–30° C. for about one hour. Thereupon the mix is cooled to about 10° C. and thereto is cautiously added sufficient water to decompose the excess hydride. The mix is filtered and the filtrate is treated at room temperature with dilute hydrochloric acid to hydrolyze the intermediate complex. The etheral solution is separated, washed with water and subjected to vacuum distillation. The residue so obtained is identified as unresolved 2-keto-4a-methyl - 1,2,4a,5,8,8a - hexahydronaphthalene.

Example II

To a suitable reaction vessel containing approximately 100 parts by weight (substantially 0.28 mol) of dl-trans-1 - p - tosyloxy-4-keto-2-methoxy-4a-methyl-1,4,4a,5,8,8a-hexahydronaphthalene dissolved in approximately 800 parts by weight of anhydrous tetrahydrofuran is slowly added with agitation a solution containing approximately 18 parts by weight (substantially 0.48 mol) of lithium aluminum hydride in approximately 700 parts by weight of anhydrous tetrahydrofuran while maintaining the temperature during the addition at about 30–35° C. Upon completion of the lithium aluminum hydride addition the mix is heated at 30–35° C. for about 30 minutes. Thereupon the mix is cooled to about 10° C. whereupon approximately 70 parts by weight of water is cautiously added to destroy the excess hydride. The mix is filtered and to the filtrate so obtained is added with agitation approximately 18 parts by weight of 2 N sulfuric acid and approximately 20 parts by weight of methanol. The mix is permitted to stand overnight whereupon the methanol is distilled off under reduced pressure. The aqueous residue is extracted with several portions of benzene which extracts are combined, washed with water, then with dilute sulfuric acid, followed by aqueous sodium bicarbonate and finally with water. The washed benzene solution is then subjected to vacuum distillation whereupon as the residue there is obtained a good yield of dl - trans - 2 - keto-4a-methyl-1,2,4a,5,8,8a-hexahydronaphthalene.

Example III

To a suitable reaction vessel containing approximately 100 parts by weight (substantially 0.24 mol) of l-trans-1-(d-camphor-10-sulfonyloxy)-4-keto-2-methoxy-4a-methyl-1,4,4a,5,8,8a-hexahydronaphthalene dissolved in approximately 1000 parts by weight of anhydrous diethyl ether is slowly added with agitation a solution containing approximately 18 parts by weight (substantially 0.48 mol) of lithium aluminum hydride in approximately 700 parts by weight of anhydrous diethyl ether while maintaining the temperature during the addition at about 30–35° C. Upon completion of the lithium aluminum hydride addition the mix is heated at 30–35° C. for about one hour. The mixture is then cooled to room temperature and thereto is added sufficient water to destroy the excess hydride. The mixture is filtered and the filtrate is treated with sufficient dilute sulfuric acid to hydrolyze the intermediate complex. The etheral layer is separated, washed with water and subjected to vacuum distillation. The residue so obtained is l-trans-2-keto-4a-methyl-1,2,4a,-5,8,8a-hexahydronaphthalene.

Example IV

Employing the same procedure as Example III but replacing l-trans-1-(d - camphor-10-sulfonyloxy)-4-keto - 2-methoxy - 4a - methyl-1,4,4a,5,8,8a-hexahydronaphthalene with an equimolar amount of d-trans-1-(d-camphor-10-sulfonyloxy) - 4 - keto-2-methoxy-4a-methyl-1,4,4a,5,8,8a-hexahydronaphthalene a good yield of d-trans-2-keto-4a-methyl-1,2,4a,5,8,8a-hexahydronaphthalene is obtained.

Other sulfonic acid esters which are operable in preparing 2 - keto - 4a - methyl-1,2,4a,5,8,8a-hexahydronaphthalene in accordance with the process of this invention are the sulfonic acid esters disclosed and claimed in co-pending application Serial No. 318,076, filed October 31, 1952, now U. S. 2,689,256, that is esters of the structural formula

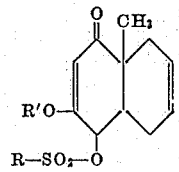

where R is an aromatic radical, such as phenyl, tolyl, ethylphenyl, cumyl, hexylphenyl, xylyl, cymyl, mesityl, triethylphenyl, biphenyl, indenyl, naphthyl, methylnaphthyl, etc., and where R' is a short chain alkyl radical such as methyl, ethyl, propyl, butyl, amyl, etc. Other operable ester reactants are those of the foregoing structural formula wherein R is cyclohexyl, hexyl, heptyl, octyl, decyl, dodecyl, tetradecyl, octadecyl, tetrahydronaphthyl, anthracyl, phenanthryl, etc.

Still other operable ester reactants in the process of this invention are those of the foregoing structural formula wherein R is a camphoryl radical such as those disclosed and claimed in co-pending application Serial No. 319,409 filed November 7, 1952, now U. S. 2,689,257.

Although the quantity of lithium aluminum hydride may vary widely in the process of this invention, ordinarily its molar ratio to the sulfonic acid ester reactant will be in excess of about 0.75:1. It is preferred that molar ratio be in the range of about 1 to 3 of lithium aluminum hydride to 1 of the sulfonic acid ester reactant.

Ordinarily anhydrous diethyl ether will be employed in the process of this invention, however, other anhydrous lower aliphatic ethers may be employed, for example, di-propyl ether, di-butyl ether, tetra-hydrofuran, etc. It is preferred that the ether solvent employed have a boiling point in the range of about 20° C. to about 100° C.

Although it is preferred to carry out the reaction of lithium aluminum hydride with the sulfonic acid ester reactant at about 20–35° C., temperatures above or below can be employed. Ordinarily a range of about 20–80° C. will be satisfactory.

Although the invention has been described with respect to certain embodiments it is to be understood that it is not so limited but that substantial variations obvious to those skilled in the art in the reactants, reaction conditions, mode of mixing the reagents, etc. may be made without departing from the spirit or scope of this invention.

What is claimed is:

1. The process which comprises reacting at about 20–35° C. with lithium aluminum hydride in tetrahydrofuran a trans-sulfonic acid ester of a 1-hydroxy-2-methoxy-4-keto-4a-methyl-1,4,4a,5,8,8a-hexahydronaphthalene of the structure

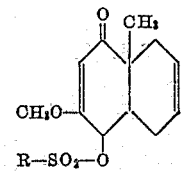

where R is a tolyl radical and hydrolyzing the intermediate complex so formed with aqueous mineral acid thereby obtaining the carbocyclic ketone trans-2-keto-4a-methyl-1,2,4a,5,8,8a-hexahydronaphthalene, the molar ratio of lithium aluminum hydride to the sulfonic acid ester reactant being in the range of about 1–3:1.

2. The process which comprises reacting at about 20–35° C. with lithium aluminum hydride in tetrahydrofuran a trans-sulfonic acid ester of a 1-hydroxy-2-methoxy-4-keto-4a-methyl-1,4,4a,5,8,8a-hexahydronaphthalene of the structure

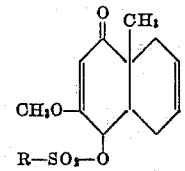

where R is the p-tolyl radical and hydrolyzing the intermediate complex so formed with aqueous mineral acid thereby obtaining the carbocyclic ketone trans-2-keto-4a-methyl-1,2,4a,5,8,8a-hexahydronaphthalene, the molar ratio of lithium aluminum hydride to the sulfonic acid ester reactant being in the range of about 1–3:1.

References Cited in the file of this patent
UNITED STATES PATENTS

| | | |
|---|---|---|
| 2,373,298 | Dougherty et al. | Apr. 10, 1945 |
| 2,689,256 | Speziale et al. | Sept. 14, 1954 |
| 2,689,257 | Thompson | Sept. 14, 1954 |
| 2,713,068 | Speziale | July 12, 1955 |
| 2,760,980 | Meyer et al. | Aug. 28, 1956 |

OTHER REFERENCES

Feiser et al.: Org. Chem., 2nd ed., pp. 116–117, publ. 1950.

Woodward et al.: J. A. C. S., vol. 74, Sept. 6, 1952, No. 17, pp. 4224–4226.